March 17, 1936.  G. F. YAGER  2,034,645
TOOL SLIDE ASSEMBLY
Filed Sept. 28, 1931  2 Sheets-Sheet 1
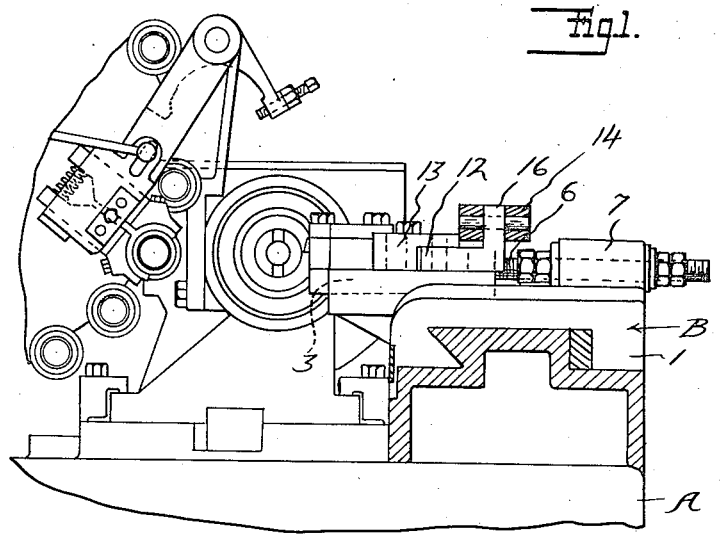
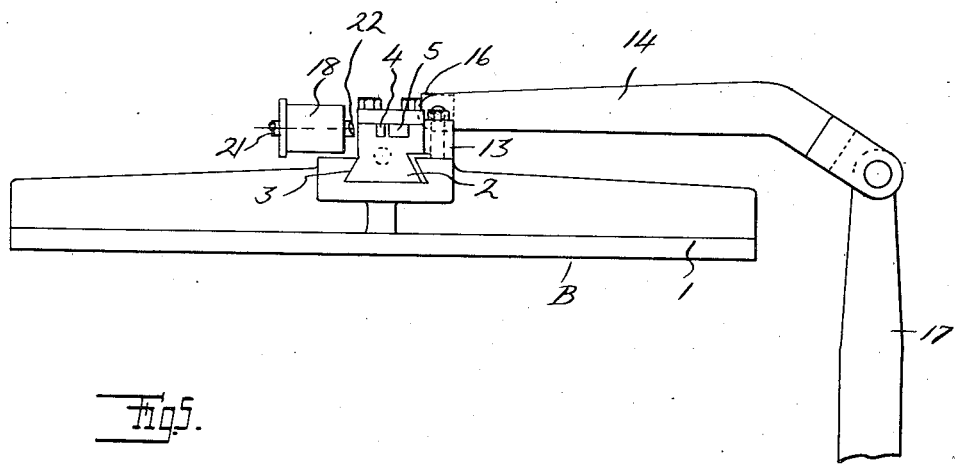
INVENTOR
George F. Yager
BY
ATTORNEYS March 17, 1936.   G. F. YAGER   2,034,645
TOOL SLIDE ASSEMBLY
Filed Sept. 28, 1931   2 Sheets-Sheet 2
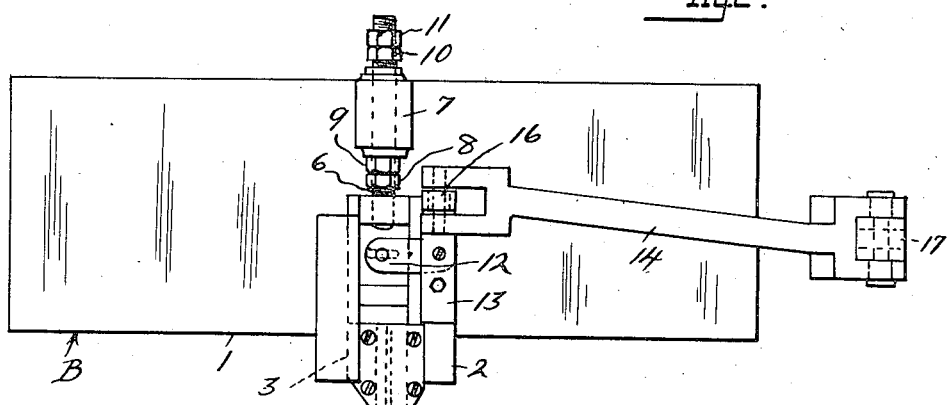
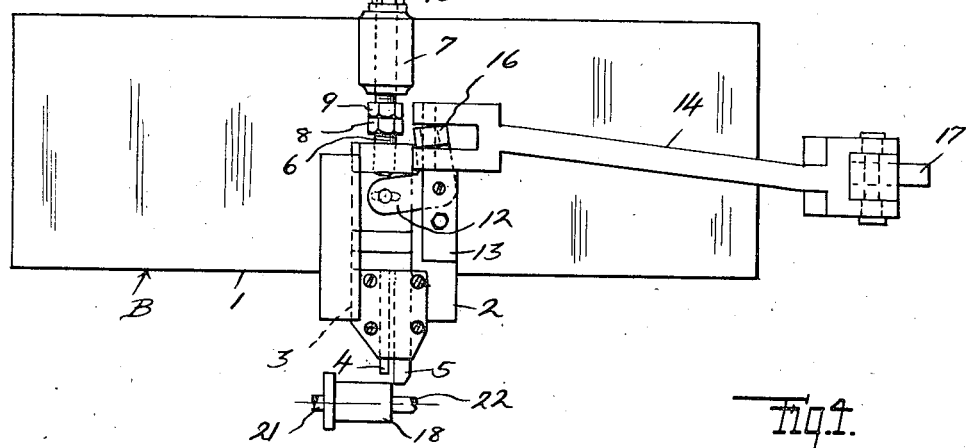
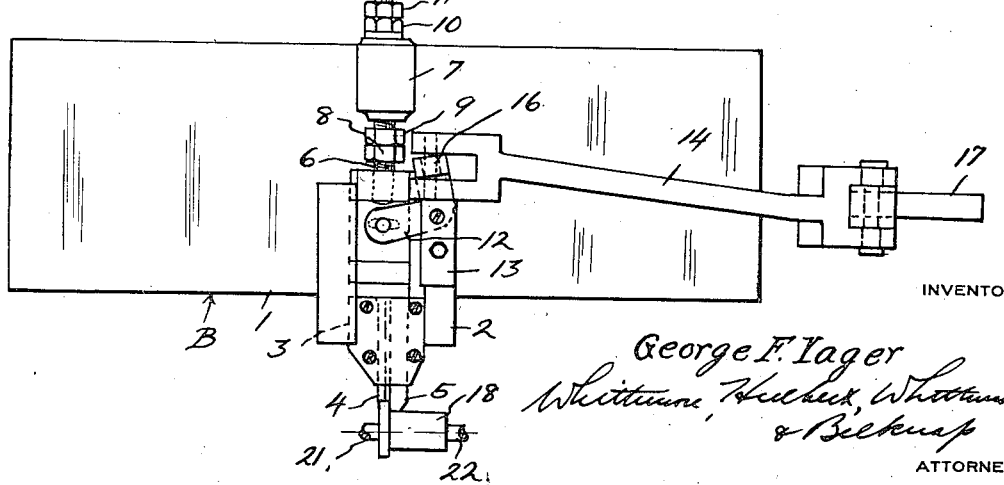
INVENTOR
George F. Yager
ATTORNEYS Patented Mar. 17, 1936

2,034,645

UNITED STATES PATENT OFFICE 2,034,645

TOOL SLIDE ASSEMBLY

George F. Yager, Toledo, Ohio, assignor to The Bunting Brass & Bronze Company, Toledo, Ohio, a corporation of Ohio Application September 28, 1931, Serial No. 565,617

23 Claims. (Cl. 82—24)

This invention relates generally to turning machines such as that illustrated in my pending application, Serial No. 565,616 and refers more particularly to an improved tool slide assembly constituting a part of the structure set forth in said application.

One of the essential objects of the invention is to provide an assembly of this type wherein a tool holder carried by a movable support is initially movable transversely of its support toward the work so that a tool or tools carried thereby will be in operative turning position relative to the work, and that is subsequently movable with its support longitudinally of the work so that the tool may effect the turning operation.

Another object is to provide an assembly wherein the tool holder, after the turning operation, is initially moved transversely of its support away from the work so that the work will not be marred, scratched or otherwise damaged by the tool or tools carried by the holder when the latter and its support are returned lengthwise of the work to their initial starting positions.

Another object is to provide an assembly wherein means is provided for adjusting and regulating the movements of the tool holder on its support to compensate for work of various sizes.

Other objects, advantages and novel details of construction of this invention will be made more apparent as this description proceeds, especially when considered in connection with the accompanying drawings, wherein:

Figure 1 is a fragmentary elevation of a turning machine having a tool slide assembly embodying my invention;

Figure 2 is a fragmentary top plan view of the structure illustrated in Figure 1 and showing the position of the parts before the tool holder has been initially moved;

Figure 3 is a view similar to Figure 2 showing the position of the parts upon completion of the initial movement of the tool holder but prior to the turning operation;

Figure 4 is a view similar to Figure 3 showing the position of the parts upon completion of the turning operation;

Figure 5 is a front elevation of the construction illustrated in Figure 2.

Referring now to the drawings, A is the frame of a turning machine and B is a tool slide assembly embodying my invention and adjustably mounted on said frame. As shown, the assembly B includes a longitudinally movable base member or support 1 slidably engaging the frame A, a tool holder 2 slidable in a transversely extending groove or channel 3 in the support 1, turning tools 4 and 5 respectively clamped upon and projecting forwardly from the holder 2, an adjusting bolt 6 secured to the holder 2 at the rear end thereof and extending through a boss 7 on the support 1, adjusting nuts 8, 9, 10 and 11 respectively arranged in pairs on the bolt 6 at opposite ends of the boss 7, a bell crank lever 12 pivotally connected to the holder 2 and pivoted intermediate its ends upon a block 13 bolted to the support 1, and a reciprocating link 14 pivoted to an upstanding lug or projection 16 on the bell crank lever 12 and actuable by a pivoted lever 17 corresponding to lever 161 in the pending application aforesaid.

In operation, when the link 14 is moved to the left, the bell crank 12 is moved about its pivot with the result that the tool holder 2 is moved forwardly until the nut 10 abuts the rear end of the boss 7 whereupon the turning tools 4 and 5 will be in operative turning position relative to the flanged tubular casting 18 constituting the work. (Any suitable means such as the arbors 21 and 22 respectively corresponding to those illustrated in the application aforesaid may be used to support the work during the turning operation). Continued movement of the link 14 to the left causes the support 1 and holder 2 to move in unison to the left so that the tools 4 and 5 carried by the holder 2 will be moved lengthwise of the casting to effect the turning operation. Upon completion of the turning operation aforesaid the link 14 is moved to the right by the lever 17 and causes the bell crank lever 12 to turn in the opposite direction about its pivot so that the tool holder will be moved rearwardly until the adjusting nut 9 abuts the boss 7. As a result the tools 4 and 5 will be withdrawn from the casting, so that the casting will not be marred, scratched or otherwise damaged by the tools 4 and 5 when the holder 2 and support 1 are moved by the link 14 lengthwise of the casting to their initial starting positions.

While it is believed that from the foregoing description the nature and advantages of the invention will be readily apparent, I desire to have it understood that I do not limit myself to what is herein shown and described and that such changes may be resorted to when desired to fall within the scope of what is claimed.

What I claim as my invention is:

1. A tool slide assembly including a movable support, a tool holder movable transversely of the support, and means for moving the holder relative to the support and subsequently moving the support and holder in unison, including means movable relative to the support and connected directly to the holder.

2. A tool slide assembly including a movable support, a tool holder movable transversely of the support, means for moving the support, including means movable relative to the support and connected to the holder, and means for limiting movement of the holder, including means extending transversely of the support.

3. A tool slide assembly including a movable support, a movable tool holder on said support, means associated with the support and holder for limiting movement of the latter relative to the former, and means associated with the holder for moving the holder relative to the support and operable automatically when the movement of the holder relative to the support is limited to move the support and holder in unison.

4. A tool slide assembly including a reciprocating support, a reciprocating tool holder movable transversely of said support, means including an element connected to the support for reciprocating the tool holder independently of the support, and a connection between said holder and support operable after said holder has been moved to move the support.

5. A tool slide assembly including a tool holder movable in one direction, means for moving said holder, and a support for the holder movable in a direction substantially at right angles to the direction in which the holder is movable, and a driving connection between the holder and support operable to move the latter by the former and to move the former while permitting the latter to remain stationary.

6. A tool slide assembly including a reciprocating tool holder, a reciprocating support therefor, means connected to the holder and associated with the support for moving the tool holder in one direction and for subsequently moving both the holder and support in another direction.

7. A tool slide assembly including a support, a tool holder movable on said support, and means for moving the holder relative to the support and then moving the support including a longitudinally movable member free with respect to the support, and a pivotally mounted member mounted on the support and terminally connected to said holder and longitudinally movable member.

8. A tool slide assembly including a support, a reciprocating tool holder movable transversely of said support, and means for moving the tool holder relative to the support and for subsequently moving the support, including a reciprocating member free with respect to and movable lengthwise of said support, and a driving connection between said member and holder including a part associated with the support.

9. In a tool slide assembly, a longitudinally movable base, a tool holder movable transversely of and laterally from the base, and means for first moving the tool holder and then the support including a pivoted lever free with respect to the base, a member pivoted on the base and connected to the holder, and a link free with respect to the base and terminally connected to the lever and member.

10. A tool slide assembly including a longitudinally movable support, a longitudinally movable tool holder extending transversely of and movable relative to said support, a connection between the holder and support operable to limit movement of the holder relative to the support, a turning tool carried by said holder, and means including loosely connected elements for moving the holder relative to the support so that the tool will be in operative turning position relative to the work, and operable when the connection aforesaid limits movement of the holder relative to the support to move the holder and support in unison lengthwise of the work to effect the turning operation, one of said elements being a reciprocating member, and the other of said elements being a bell crank lever terminally connected to the member and holder and pivoted intermediate its ends on the support.

11. A tool slide assembly including a longitudinally movable support, a longitudinally movable tool holder extending transversely of said support, and means for moving the support longitudinally including means connected to and operable to move the tool holder relative to said support.

12. A tool slide assembly including a movable support, a movable tool holder upon said support, a connection between the holder and support operable to limit movement of the holder relative to said support, and means for initially moving the holder relative to the support and operable when movement of the holder is limited as aforesaid to move the support and holder in unison, said last mentioned means including means connected directly to the holder and movable relative to the support.

13. A tool slide assembly including a support, a boss on said support, a tool holder movable on the support relative to said boss, a member carried by the holder and slidably engaging said boss, elements on the member engageable with the boss to limit movement of the holder relative to the support, and actuating means for the holder operable to move the holder relative to the support until one of said elements engages the boss and then to move the support and holder in unison, the time when the support is moved being dependent upon the stroke of the holder, and the elements aforesaid being adjustable on the member relative to the boss so that the stroke of the holder may be varied.

14. A tool slide assembly including a longitudinally movable support, a tool holder mounted on and movable transversely of said support, and means associated with the tool holder for initially moving the holder and for subsequently moving the support.

15. A tool slide assembly including a longitudinally movable support, a longitudinally movable tool holder extending transversely of said support, and means for initially moving the holder transversely of the support and for subsequently moving the support and holder in unison, including means movable longitudinally of the support and operatively connected to the holder.

16. A tool slide assembly including a longitudinally movable support, a work holder at one side of the support, a tool holder slidable transversely of the support toward and away from the work holder, a connection between the tool holder and support operable to limit sliding movement of the holder relative to the support, a turning tool carried by said tool holder engageable with work in the work holder, and means for moving the tool holder toward the support and operable when the connection aforesaid limits movement of the holder relative to the support to move the support longitudinally while maintaining the tool in operative engagement with the work.

17. A tool slide assembly including a longitudinally movable support, a longitudinally movable tool holder extending transversely of and movable relative to said support, a connection between the tool holder and support operable to limit movement of the holder relative to the support, and means for initially moving the tool holder relative to the support and operable when the connection aforesaid limits movement of the holder relative to the support to subsequently move the support longitudinally, including a reciprocating element, and a pivotally mounted element terminally connected to said reciprocating element and tool holder.

18. A tool slide assembly including a longitudinally movable support, a longitudinally movable tool holder extending transversely of and movable relative to said support, a connection between the tool holder and support operable to limit sliding movement of the holder in opposite directions relative to the support, and means for initially moving the tool holder in one direction relative to the support and operable when the connection aforesaid limits movement of the holder in said direction relative to the support to move the support longitudinally, said means being operable to move the tool holder in the opposite direction relative to the support and being operable when the connection aforesaid limits movement of the holder in the latter direction relative to the support to move the support longitudinally.

19. A tool slide assembly including a longitudinally movable support, a longitudinally movable tool holder extending transversely of and movable relative to said support, a connection between the tool holder and support operable to limit longitudinal movement of the holder relative to the support, and means for initially moving the tool holder in one direction relative to the support and operable when the connection aforesaid limits movement of the holder relative to the support to move the support longitudinally.

20. A tool slide assembly including a longitudinally movable support, a longitudinally movable tool holder extending transversely of and movable relative to said support, means for limiting movement of the tool holder relative to the support including a member adjustable on the support relative to the holder, and means for moving the holder relative to the support and operable when movement of the holder is limited by the means aforesaid to subsequently move the support and holder in unison.

21. A tool slide assembly including a longitudinally movable support, a longitudinally movable tool holder upon and movable relative to said support, and means associated with the holder and support for moving the holder relative to the support and subsequently moving the support and holder in unison.

22. A tool slide assembly including a longitudinally movable support, a longitudinally movable tool holder extending transversely of and movable relative to said support, and means for initially moving the holder longitudinally relative to the support and subsequently moving the support longitudinally, including a member pivoted on the support and having a slotted connection with the holder.

23. A tool slide assembly including a longitudinally movable support, a tool holder upon and movable transversely of said support, and means operable to initially move the holder transversely of the support and subsequently operable to move the support longitudinally.

GEORGE F. YAGER.